(12) United States Patent
Burattini

(10) Patent No.: US 11,098,264 B2
(45) Date of Patent: Aug. 24, 2021

(54) PROCESS FOR PRODUCING LIPIDS AND OTHER ORGANIC COMPOUNDS FROM BIOMASS

(71) Applicant: ENI S.P.A., Rome (IT)

(72) Inventor: Mauro Burattini, Cornaredo (IT)

(73) Assignee: ENI S.P.A., Rome (IT)

( * ) Notice: Subject to any disclaimer, the term of this patent is extended or adjusted under 35 U.S.C. 154(b) by 199 days.

(21) Appl. No.: 16/462,019

(22) PCT Filed: Dec. 1, 2017

(86) PCT No.: PCT/IB2017/057565
§ 371 (c)(1),
(2) Date: May 17, 2019

(87) PCT Pub. No.: WO2018/100544
PCT Pub. Date: Jun. 7, 2018

(65) Prior Publication Data
US 2019/0330562 A1  Oct. 31, 2019

(30) Foreign Application Priority Data
Dec. 2, 2016 (IT) .................. 102016000122525

(51) Int. Cl.
*C11B 1/10* (2006.01)
*C11B 13/00* (2006.01)
(Continued)

(52) U.S. Cl.
CPC ............ *C11B 1/10* (2013.01); *C08B 37/0003* (2013.01); *C11B 13/00* (2013.01); *C11C 3/12* (2013.01)

(58) Field of Classification Search
CPC ........... C11B 1/10; C11B 13/00; B01D 11/02; C08B 37/0003
See application file for complete search history.

(56) References Cited

U.S. PATENT DOCUMENTS 3,813,329 A * 5/1974 Gatsis .................. C10G 1/083
208/390
5,269,947 A  12/1993 Baskis
(Continued)

FOREIGN PATENT DOCUMENTS

EP    1728844 A1   12/2006
WO   2009003633 A1   1/2009
(Continued)

OTHER PUBLICATIONS

International Search Report and Written Opinion for PCT/IB2017/057565, dated Apr. 9, 2018, 13 pages.
(Continued)

*Primary Examiner* — Yate' K Cutliff
(74) *Attorney, Agent, or Firm* — Husch Blackwell LLP

(57) ABSTRACT

Process for producing lipids and other organic compounds from biomass comprising the following steps: (a) subjecting said biomass to extraction, at room temperature, in the presence of at least one low-boiling point solvent, thereby obtaining a first organic phase comprising lipids and solvent, and a first slurry phase comprising carbohydrates and proteins; (b) subjecting the first organic phase obtained in said step (a) to evaporation of the solvent, obtaining a second organic phase comprising lipids and a third organic phase comprising solvent, which is recycled to said step (a); (c) subjecting the first slurry phase obtained in said step (a) to liquefaction operating at a temperature ranging from 100° C. to 200° C., preferably ranging from 110° C. to 180° C., at a pressure greater than the water vapor pressure at the temperature at which said liquefaction is carried out, for a time ranging from 30 minutes to 300 minutes, preferably ranging from 50 minutes to 270 minutes, thereby obtaining a second slurry phase comprising sugars, proteins and unconverted carbohydrates; (d) subjecting the second slurry phase obtained in said step (c) to separation, obtaining an aqueous (Continued)

phase comprising sugars and a wet solid phase comprising proteins and unconverted carbohydrates. The lipids thus obtained may be advantageously used in the production of biodiesel or green diesel that may be used, in turn, as such, or in mixtures with other fuels, for automotive transport. The aqueous phase comprising sugars and the wet solid phase comprising proteins and unconverted carbohydrates thus obtained may in turn be exploited.

20 Claims, 3 Drawing Sheets

(51) Int. Cl.
*C08B 37/00* (2006.01)
*C11C 3/12* (2006.01)

(56) References Cited

U.S. PATENT DOCUMENTS

| | | | |
|---|---|---|---|
| 5,932,090 | A | 8/1999 | Marchionna et al. |
| 7,691,256 | B2 | 4/2010 | Montanari et al. |
| 8,017,000 | B2 | 9/2011 | Montanari et al. |
| 8,057,660 | B2 | 11/2011 | Marchionna et al. |
| 8,123,932 | B2 | 2/2012 | Montanari et al. |
| 8,147,675 | B2 | 4/2012 | Marchionna et al. |
| 8,796,479 | B2 | 8/2014 | Pinches |
| 8,809,026 | B2 | 8/2014 | Vanhercke et al. |
| 9,598,652 | B2 | 3/2017 | Marchionna et al. |
| 9,708,554 | B2 | 7/2017 | Patron et al. |
| 9,765,266 | B2 | 9/2017 | Bellussi et al. |
| 9,809,781 | B1 * | 11/2017 | Maddi ............... C07K 14/405 |
| 2008/0160593 | A1 | 7/2008 | Oyler |
| 2010/0219104 | A1 | 9/2010 | Del Bianco et al. |
| 2010/0314241 | A1 * | 12/2010 | Plopski ............... C02F 1/26 203/76 |
| 2012/0055077 | A1 * | 3/2012 | Savage ............... C10L 1/02 44/307 |
| 2012/0116105 | A1 | 5/2012 | Aaltonen et al. |
| 2013/0075061 | A1 | 3/2013 | Guedes Soares |
| 2013/0112593 | A1 | 5/2013 | Montanari et al. |
| 2013/0225846 | A1 | 8/2013 | Domaille et al. |
| 2014/0004571 | A1 * | 1/2014 | Garrett ............... C12P 19/14 435/99 |
| 2014/0155663 | A1 | 6/2014 | Rispoli et al. |
| 2014/0275299 | A1 | 9/2014 | Bedwell et al. |
| 2015/0051414 | A1 | 2/2015 | Griffin et al. |
| 2015/0184087 | A1 | 7/2015 | Patron et al. |

FOREIGN PATENT DOCUMENTS

| | | |
|---|---|---|
| WO | 2009003634 A1 | 1/2009 |
| WO | 2010/069516 A2 | 6/2010 |
| WO | 2013063085 A1 | 5/2013 |
| WO | 2015/075630 A1 | 5/2015 |

OTHER PUBLICATIONS

Kumar et al. Bioresour. Bioprocess. (2017) 4:18.
Steeper Energy. Hydrofaction. https://steeperenergy.com/hydrofaction/ Apr. 19, 2021, 6 pages.
Chiaberge S. et al., "Amides in Bio-oil by Hydrothermal Liquefaction of Organic Wastes: A Mass Spectrometric Study of the Thermochemical Reaction Products of Binary Mixtures of Amino Acids and Fatty Acids", Energy & Fuels (2013), vol. 27, pp. 5287-5297.
Chiaberge S. et al., "Characterization of Bio-oil from Hydrothermal Liquefaction of Organic Waste by NMR Spectroscopy and FTICR Mass Spectrometry", ChemSusChem (2013), vol. 6, pp. 160-167.
Goudriaan F. et al, "Liquid fuels from biomass via a hydrothermal process", Chemical Engineering Science (1990), vol. 45(8), pp. 2729-2734.
Deniel M. et al., "Energy valorisationoffoodprocessingresiduesand modelcompoundsbyhydrothermalliquefaction" Renewable and Sustainable Energy Reviews (2016), vol. 54, p. 1632-1652.
Josh Peterson. "Bad Economy, Production Problems Gobble Turkey Diesel Company". Mar. 15, 2009. <http://www.treehugger.com/corporate-responsibility/bad-economy-production-problems-gobble-turkey-diesel-company.html>.
Miller, Gabriel, Society for Energy and Environmental Research. "Energy Supply—Production of Fuel from Agricultural and Animal Waste". Mar. 2009. <www.osti.gov/scitech/servlets/purl/950036> pp. 1-70.
Hacker, John, "Canadian firm acquires Carthage RES plant" The Wayback Machine, Apr. 18, 2013, https://web.archive.org/web/20150804040113/http://www.carthagepress.com:80/article/20130416/news/130419181.

* cited by examiner

PROCESS FOR PRODUCING LIPIDS AND OTHER ORGANIC COMPOUNDS FROM BIOMASS

CROSS-REFERENCE TO RELATED APPLICATIONS

This application is the National Stage of International Application No. PCT/IB2017/057565, filed Dec. 1, 2017.

TECHNICAL FIELD

The present invention relates to a process for producing lipids and other organic compounds from biomass.

More in particular, the present invention relates to a process for producing lipids and other organic compounds from biomass comprising: subjecting said biomass to extraction, at room temperature, in the presence of at least one low-boiling point solvent, obtaining a first organic phase comprising lipids and solvent and a first slurry phase comprising carbohydrates and proteins; subjecting said first organic phase to evaporation of the solvent obtaining a second organic phase comprising lipids and a third organic phase comprising solvent, which is recycled to said extraction; subjecting said first slurry phase to liquefaction obtaining a second slurry phase comprising sugars, proteins and unconverted carbohydrates; subjecting said second slurry phase to separation obtaining an aqueous phase comprising sugars and a wet solid phase comprising proteins and unconverted carbohydrates.

The lipids thus obtained may be advantageously used in the production of biodiesel or green diesel that may be used, in turn, as such, or in mixtures with other fuels, for automotive transport. The aqueous phase comprising sugars and the wet solid phase comprising proteins and unconverted carbohydrates thus obtained may in turn be exploited.

BACKGROUND

As it is known, in the European Union, for fuels or the production of electricity, it is compulsory to use "components of biological origin".

The legislation in force on biofuels derives from the European standards "Fuel Quality Directive" (FQD 2009/30/EC) and "Renewable Energy Directive" (RED 2009/28/EC). Among its main interventions, the RED 2009/28/EC imposes the introduction of "components of biological origin" in conventional fossil fuels, up to 10% calorific value by 2020. The legislative framework is developing: in particular, to date, a proposal to amend RED 2009/28/EC is being discussed, which aims to introduce a maximum limit of 7% for biofuels from first generation sources, i.e. deriving from sources in competition with food (for example, palm oil, rapeseed, soy, etc.) and to introduce a minimum quantity of "advanced biofuels". Among the raw materials identified as being of "advanced biofuel" origin, there are biomasses that derive from sources not in competition with food production: said biomasses are defined better below.

Treatment technologies for biomass deriving from sources not in competition with food production, in particular from organic material deriving from the separate collection of municipal solid waste, currently used, may be categorized in the following four types, according to the final product to be obtained:

(1) composting systems, for the purpose of producing high quality organic compost intended for the agricultural and floricultural sector;

(2) anaerobic digestion systems, for the purpose of energy recovery, converting the organic fraction to biogas;

(3) aerobic stabilization or bio-stabilization systems, for the purpose of pre-treating the organic fraction in order to minimize the negative effects connected with the presence of putrescible substance in landfill, or with the production of a compost suitable for environmental recovery known as "Stabilized Organic Fraction" (SOF);

(4) heat treatments for the purpose of recovering material and energy.

The heat treatments (4) differ from the technologies referred to in points (1), (2) and (3), both in terms of the product potentially obtainable, and the investment required, since the latter is generally much higher. The heat treatments (4) may include, for example:

(4a) combustion, in which the biomass is transformed into energy;

(4b) gasification, in which the biomass is transformed into synthesis gas;

(4c) pyrolysis, in which the biomass is transformed into bio-oil;

(4d) liquefaction, in which the biomass is transformed into bio-oil.

In composting systems and in anaerobic stabilization, the lipid component of the biomass is lost and transformed into carbon dioxide ($CO_2$), in anaerobic digestion systems the lipid component of the biomass is transformed into biogas, i.e. carbon dioxide ($CO_2$) and methane, whereas heat treatments such as, for example, gasification combined with Fischer-Tropsch synthesis, pyrolysis or liquefaction, allow the lipid component of biomass to be converted into a bio-oil (or "bio-crude") which may be used for producing "advanced biofuels".

Liquefaction is one of the heat treatments for converting biomasses into bio-oil whose substantial difference with respect to the other heat treatments mentioned above, i.e. combustion, gasification, pyrolysis, consists of carrying out the heat treatment directly on the wet mass and, generally, at a lower temperature.

The extraction of lipids (for example, neutral glycerides, triglycerides) and/or plant oils, may also be carried out through a process that envisages the use of solvent: said process is, for example, widely used in the food industry.

The aforementioned process may be applied to both solid mixtures and to liquid mixtures and, in the case of solid mixtures, it is normally defined as leaching. Said process substantially envisages three steps: imbibition, dissolution, transport of the plant oils and/or of lipids obtained. At industrial level, the aforementioned process may be carried out through three methods: by immersion, by percolation, or by a mixed system (i.e. immersion and percolation). Whichever method is adopted, it is important to use a suitable solvent as the quantity and quality of plant oils and/or of lipids extracted depends on this. The optimal characteristics for the solvent are, for example: low polarity, low boiling point, low heat of vaporization, capacity not to leave residues after evaporation. The most commonly used solvent for the purpose is n-hexane since it has a good cost/benefit ratio.

Generally, the quantity of plant oils and/or lipids extracted through the aforementioned process varies according to: the concentration of fatty substance present in the mixture to be treated, the quality and quantity of the solvent used, the temperature, the number of extraction steps, the contact time between fatty substance to be treated/solvent and, for solid mixtures, the diameter of the solid particles.

Other biomass treatment processes for the purpose of producing lipids and/or bio-oils are known in the art.

For example, American patent U.S. Pat. No. 8,809,026 concerns a process for extracting lipids comprising the steps of: i) extracting the lipids from parts of plants (for example, leaves, roots, tubers, etc.), said plants being genetically modified for the purpose of producing more lipids; ii) recovering the lipids extracted. Preferably, said process is carried out in the presence of an organic solvent that may be selected, for example, from hexane, diethyl ether, petroleum ether, chloroform/methanol mixture, butanol, benzene, or mixtures thereof.

American patent application US 2015/0051414 concerns a process for the extraction of lipids from a feedstock comprising: contacting a feedstock comprising water, lipids, and solid organic material with an organic solvent obtaining a mixture in which the number-weighted particle size distribution of the solid organic matter has a mean dimension of 1 mm or less, and the lipids in the mixture are in the liquid state; separating the mixture obtaining a solid and a liquid, wherein the liquid comprises some of the lipids; and removing the solvent from the solid obtaining a solid product and a fluid product, wherein the solid product has a lipid content of 20% by weight or less. Said solid organic material may be selected from plant matter, animal matter, algae, or a mixture thereof.

American patent U.S. Pat. No. 8,796,479 concerns a process for recovering tallow from a meat material comprising: reducing the meat material to particulate form; conveying the meat material continually through a process chamber containing superheated steam and which is substantially free from oxygen so that the superheated steam contacts the particles of the meat material to subject the meat material to superheated steam at a temperature above 220° C. for a period of time effective to liquefy and separate from the meat material a major amount of the tallow naturally occurring in said material, but not vaporize it, and recovering the liquefied tallow.

American patent application US 2013/0075061 concerns a device able to treat sludge and other lipid- and protein-rich organic waste through a process defined as "Low Temperature Conversion" (LTC). Said process is a low temperature pyrolysis process (380° C.-450° C.), self-catalyzed by the inorganic compounds contained in the raw starting material. Said process allows oil and coal to be obtained.

International patent application WO 2013/063085 concerns a process for obtaining polysaccharides and bio-oils from oleaginous biomass (e.g., algae) comprising: i) heating an aqueous mixture comprising said oleaginous biomass to a first temperature ranging from 155° C. to 165° C.; (ii) maintaining said aqueous mixture comprising said oleaginous biomass at said first temperature for a first period of time ranging from 15 to 25 minutes; (iii) subjecting said aqueous mixture comprising said oleaginous biomass to separation obtaining a liquid phase and a solid phase; (iv) recovering the polysaccharides from said liquid phase; (v) heating an aqueous mixture comprising said solid phase to a second temperature ranging from 237° C. to 243° C.; (vi) maintaining said aqueous mixture comprising said solid phase at said second temperature for a second period of time ranging from 15 minutes to 25 minutes; and (vii) recovering, from said aqueous mixture comprising said solid fraction, the bio-oils produced during said steps of (v) heating and (vi) maintaining. From said liquid phase, co-products may also be recovered, such as, for example, proteins, polypeptides, peptides and sugars.

American patent application US 2012/0116105 concerns a method for recovering lipids from microbial biomass comprising: (i) subjecting the wet microbial biomass to thermal pretreatment of at least 100° C.; (ii) subjecting said thermally pretreated microbial biomass to extraction using a liquid hydrocarbon, and (iii) subsequently, recovering a product containing lipids.

Dèniel M. et al., in "*Renewable and Sustainable Energy Reviews*" (2016), Vol. 54, pg. 1632-1652, describe the exploitation of food residues for the purpose of producing energy through a liquefaction treatment. In particular, the "Hydrothermal Liquefaction" (HTL) process is described, carried out in "sub-critical" conditions at a temperature ranging from 250° C. to 370° C. and at a pressure ranging from 10 MPa to 30 MPa.

Liquefaction processes currently in the development or demonstration stages are also known in the art. The liquefaction processes characterized by the highest degree of development are called "Changing Word Tech" (CWT) and "HydroThermal Upgrading" (HTU).

On that purpose, the first industrial scale system based on "Changing World Tech" (CWT) technology developed on the basis of American patent U.S. Pat. No. 5,269,947, was built in Carthage (Missouri), and was able to treat 200 t/day-250 t/day of waste deriving from the turkey processing industry, transforming it into diesel, fertilizing products and coal. Said system has suffered due to numerous stops and has never reached its full operating capacity. In 2009, the company that owns the system was declared bankrupt (website http://www.treehugger.com/corporate-responsibility/bad-economy-production-problems-gobble-turkey-diesel-company.html). In 2011 the system purchased by a Canadian company, Ridgeline Energy Services, was re-launched, continued to operate for a couple of years (website http://www.carthagepress.com/article/20130416/NEWS/130419181) and was then stopped as it was running at a loss (website http://pdfserver.amlaw.com/cli/affidavit/oca_affidavit_650841_2013_311.pdf). The brief filed at the Court of New York on 16 Jan. 2015 (website http://pdfserver.amlaw-.com/cli/affidavit/oca_affidavit_650841_2013_311.pdf), contains the details of the management and technical aspects concerning the system and the technical issues include (see pag. 6) the fact the bio-oil produced by the system created problems for the end users of said bio-oil (i.e. Erving Paper Company, APAC e Omega Proteins), substantially due to its corrosive nature.

Numerous other publications describe the aforementioned technology "Changing World Tech" (CWT): on that point, a study carried out in 2009 by Miller G. may be cited: "*Energy Supply—Production of Fuel from Agricultural and Animal Waste*" (website www.osti.gov/scitech/servlets/purl/950-036) in which, on pag. 20, a figure is provided on the acidity of the bio-oil [TAN ("Total Acid Number") equal to 113], highlighting how problems concerning the corrosive nature of a fluid are often related to the acidity thereof. A high degree of development was also reached by Shell's "Hydro-Thermal Upgrading" (HTU) technology, which was described in publications dating back to the 1980s, such as, for example, Goudriaan F. et al, in: "*Liquid fuels from biomass via a hydrothermal process*", Chemical Engineering Science (1990), Vol. 45(8), pag. 2729-2734. Said technology underwent substantial redevelopment towards the end of the 1990s succeeding in reaching pilot plant scale in 2004, able to treat 100 kg/h of biomass as described, for example, by Jansen P. in: "*Innovative biofuel production processes: Fischer-Tropsch synthesis and Hydro Thermal Upgrading*", EU-China workshop on liquid biofuel, Beijing, 4-5 Nov. 2004 (website http://ec.europa.eu/research/energy/pdf/35_peter_jansen_en.pdf). In relation to said "Hydro-Thermal Upgrading" (HTU) technology, Jansen P. also describes the following operating conditions therein:
   temperature: 300° C.-350° C.;
   reaction time: 5 minutes-20 minutes;
   in the presence of water.

A parallel experience is also that of the company SCF Technologies, which developed the "CatLiq" process for transforming organic waste into bio-oil, which closed in 2011. A recently established company, Steeper Energy, has taken up said process again, installing a pilot liquefaction plant in Denmark at the University of Aalborg, which operates through the "Hydrofaction™" proprietary technology, able to transform organic waste with low energy value into high energy value products, operating under "super-critical" water conditions (as reported on the website http://steeperenergy.com/hydrofaction).

However, the processes reported above may have some drawbacks. For example, the high temperatures and pressures at which they operate require the use of special equipment, generally made of special metal alloys, able to operate at said high temperatures and in particular at said high pressures, and high energy consumption, with a consequent increase in production costs. Furthermore, when operating at high temperatures lipids, in particular triglycerides, are not stable and cannot be recovered as such. In fact, generally, during liquefaction, the biomass is subjected to a heat treatment as reported above and the conversion takes place through a multi-phase process for the formation and simultaneous presence of a gaseous phase, rich in acidic gases [for example, carbon dioxide ($CO_2$), sulfuric acid ($H_2S$)], an aqueous phase, an organic or oily phase consisting of bio-oil, and a solid phase consisting of carbon and inorganic residues. The multi-phase system is very complex and reactive due to the probable presence of free radicals generated by homolytic fission and caused by high temperatures. Inevitably, every individual component present in the starting biomass undergoes transformations (for example, deamination, decarboxylation, hydrolysis, etc.), fissions and consequent re-arrangements to form nitrogen products (for example, amides, nitriles, etc.), esters and aromatic compounds. Carbohydrates are to be considered separately which, in a highly reactive environment, decompose totally to form acids, alcohols and carbon residue with a polyaromatic structure whose carbon/hydrogen ratio tends towards unity. The residue, more similar to the organic or oily phase, makes the subsequent oil/water/residue separation phase itself extremely critical since the viscosity of the organic fluid increases exponentially compromising the normal operation of some equipment, including filters. This problem is even more marked the higher the carbohydrate content in the starting biomass. In addition to the highlighted technical/management problem, there is also the problem due to the fact that the separate phases contain combinations of components derived from lipids, proteins and carbohydrates and this reduces their possibility for use and the right exploitation.

The Applicant therefore set out to solve the problem of finding a process that allows the production of lipids and other organic compounds, in particular sugars and proteins, from biomass, able to overcome the aforementioned drawbacks.

SUMMARY

The Applicant has now found that the production of lipids and other organic compounds, in particular sugars and proteins from biomass, may be advantageously carried out through a process comprising: subjecting said biomass to extraction, at room temperature, in the presence of at least one low-boiling point solvent, obtaining a first organic phase comprising lipids and solvent, and a first slurry phase comprising carbohydrates and proteins; subjecting said first organic phase to evaporation of the solvent, obtaining a second organic phase comprising lipids and a third organic phase comprising solvent, which is recycled to said extraction; subjecting said first slurry phase to liquefaction obtaining a second slurry phase comprising sugars, proteins and unconverted carbohydrates; subjecting said second slurry phase to separation, obtaining an aqueous phase comprising sugars and a wet solid phase comprising proteins and unconverted carbohydrates.

The lipids thus obtained may be advantageously used in the production of biodiesel or green diesel that may be used, in turn, as such, or in mixtures with other fuels, for automotive transport. The aqueous phase comprising sugars and the wet solid phase comprising proteins and unconverted carbohydrates thus obtained may in turn be exploited. For example, the aqueous phase comprising sugars, with a high COD ("Chemical Oxygen Demand") and high biodegradability, may be used in anaerobic digestion for producing biogas, or in fermentation for producing microorganisms that, in turn, may produce lipids, or ethanol. The wet solid phase comprising proteins and unconverted carbohydrates may be further treated for the purpose of producing proteins to be used in zootechnics for producing feed, or bio-gas and bio-oil to be used for producing energy and biofuels.

Hence, the subject matter of the present invention is a process for producing lipids and other organic compounds from biomass comprising the following steps:

(a) subjecting said biomass to extraction, at room temperature, in the presence of at least one low-boiling point solvent, thereby obtaining a first organic phase comprising lipids and solvent, and a first slurry phase comprising carbohydrates and proteins;

(b) subjecting the first organic phase obtained in said step (a) to evaporation of the solvent, obtaining a second organic phase comprising lipids and a third organic phase comprising solvent, which is recycled to step (a);

(c) subjecting the first slurry phase obtained in said step (a) to liquefaction operating at a temperature ranging from 100° C. to 200° C., preferably ranging from 110° C. to 180° C., at a pressure greater than the water vapor pressure at the temperature at which said liquefaction is carried out, for a time ranging from 30 minutes to 300 minutes, preferably ranging from 50 minutes to 270 minutes, thereby obtaining a second slurry phase comprising sugars, proteins and unconverted carbohydrates;

(d) subjecting the second slurry phase obtained in said step (c) to separation, obtaining an aqueous phase comprising sugars and a wet solid phase comprising proteins and unconverted carbohydrates.

DETAILED DESCRIPTION

Figure 1:
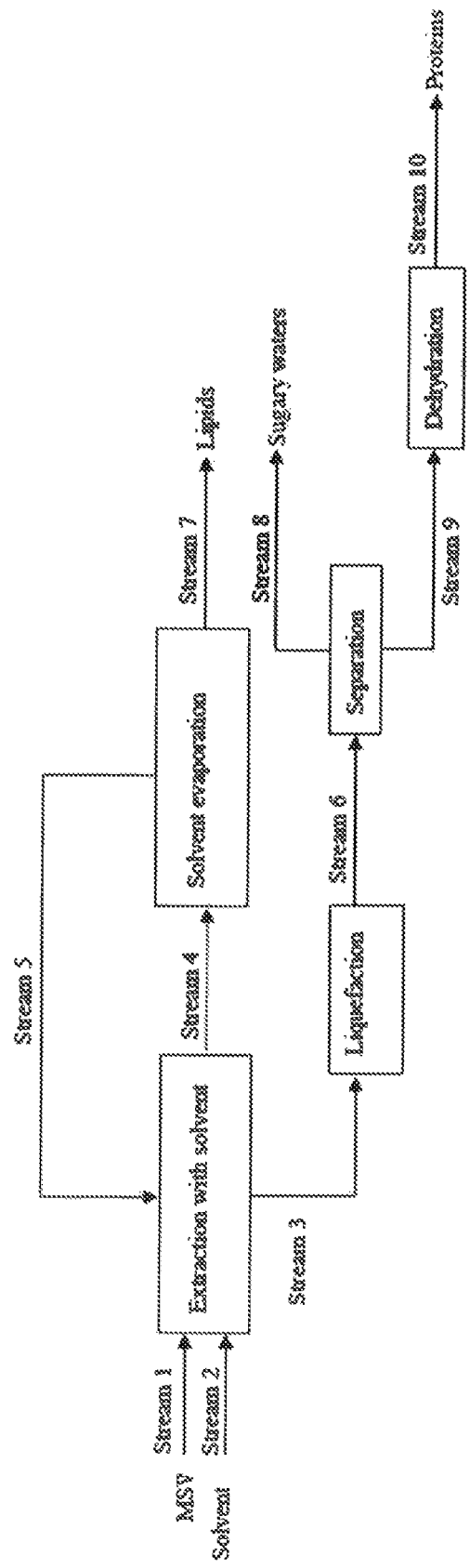
FIG. 1 illustrates a process for producing lipids and other organic compounds according to a first embodiment.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

For the purpose of the present description and of the following claims, the term "slurry phase" indicates a fluid mixture of water with solids in suspension (e.g., carbohydrates and proteins).

For the purpose of the present description and of the following claims, the term "other organic compounds" mainly means carbohydrates and proteins.

For the purpose of the present description and of the following claims, the term "biomass" indicates:
- municipal solid waste that may be selected, for example, from: organic material deriving from separate waste collection, organic material selected from mixed municipal solid waste, or mixtures thereof; or mixtures of said organic material with prunings and/or agricultural waste;
- primary and biological sludge produced in waste water purification plants;
- residues and/or waste deriving from agricultural and/or zootechnical activities;
- residues and/or waste deriving from the agri-food industry;
- residues and/or waste deriving from agricultural processes, forestation and/or from forestry;
- micro-algae and/or macro-algae;
- cyanobacteria;

or mixtures thereof.

For the purpose of the present description and of the following claims the term "room temperature" indicates a temperature ranging from 20° C. to 25° C.

For the purpose of the present description and of the following claims, the term "low-boiling point solvent" indicates a solvent having a boiling point less than or equal to 150° C.

In accordance with a preferred embodiment of the present invention, said extraction step (a) may be carried out for a time ranging from 2 hours to 12 hours, preferably ranging from 3 hours to 10 hours.

In accordance with a preferred embodiment of the present invention, the low-boiling point solvent used in said step (a) may be selected, for example, from: aliphatic hydrocarbons such as, for example, n-pentane, n-hexane, n-heptane, n-octane, kerosene, or mixtures thereof; aromatic hydrocarbons such as, for example, toluene, xylene, or mixtures thereof; ketones such as, for example, acetone, methylethylketone, or mixtures thereof; esters such as, for example, ethyl acetate, propyl acetate, or mixtures thereof; halogenated hydrocarbons such as, for example, dichloromethane, chloroform, or mixtures thereof; or mixtures thereof. n-hexane, acetone, dichloromethane, or mixtures thereof, are preferred. n-hexane, n-hexane/acetone mixture (1/1, v/v), n-hexane/xylene mixture (1/1, v/v), dichloromethane, are particularly preferred.

Optionally, said biomass may be subjected to pre-treatments prior to being subjected to said extraction step (a).

In accordance with a preferred embodiment of the present invention, said biomass may be treated by subjecting it to a preliminary homogenization, grinding or sizing process, prior to being subjected to said extraction step (a).

In accordance with a preferred embodiment of the present invention, said biomass is wet. Preferably, said biomass may have a water content greater than or equal to 50% by weight, preferably ranging from 55% by weight to 90% by weight, with respect to the total weight of said biomass.

In accordance with a further embodiment of the present invention, said biomass may be subjected to a preliminary dehydration process.

Therefore further subject matter of the present invention is a process for producing lipids and other organic compounds from biomass comprising:

($a_1$) subjecting said biomass to a dehydration process operating at a temperature ranging from 30° C. to 60° C., preferably ranging from 35° C. to 55° C., at a pressure ranging from 50 mbar to 1 bar, preferably ranging from 80 mbar to 150 mbar, for a time ranging from 1 hour to 48 hours, preferably ranging from 12 hours to 24 hours, obtaining a dehydrated biomass;

($a_2$) subjecting said dehydrated biomass to extraction, at room temperature, in the presence of at least one low-boiling point solvent, thereby obtaining a first organic phase comprising lipids and solvent, and a dehydrated solid phase comprising carbohydrates and proteins;

($b_1$) subjecting the first organic phase obtained in said step ($a_2$) to evaporation of the solvent, obtaining a second organic phase comprising lipids and a third organic phase comprising solvent, which is recycled to step ($a_2$);

($c_1$) subjecting the dehydrated solid phase obtained in said step ($a_2$), after adding water in a quantity such as to obtain a water concentration ranging from 50% by weight to 90% by weight, preferably ranging from 60% by weight to 80% by weight, with respect to the total weight of said dehydrated solid phase, obtaining a first slurry phase, at liquefaction operating at a temperature ranging from 100° C. to 200° C., preferably ranging from 110° C. to 180° C., at a pressure greater than the water vapor pressure at the temperature at which said liquefaction is carried out, for a time ranging from 30 minutes to 300 minutes, preferably ranging from 50 minutes to 270 minutes, obtaining a second slurry phase comprising sugars, proteins and unconverted carbohydrates;

($d_1$) subjecting the second slurry phase obtained in said step ($c_1$) to separation, obtaining an aqueous phase comprising sugars and a wet solid phase comprising proteins and unconverted carbohydrates.

It is to be noted that for the purpose of the present invention, the aforementioned dehydration step ($a_1$) is carried out for the necessary time to bring the biomass to a constant weight overtime.

For the purpose of the present invention, said extraction step ($a_2$) is carried out under the same operating conditions as said extraction step (a) and the low boiling-point solvent used is selected from those mentioned above.

In accordance with a preferred embodiment of the present invention, said biomass may be treated by subjecting it to a preliminary homogenization, grinding or sizing process, prior to being subjected to said dehydration step ($a_1$).

In accordance with a preferred embodiment of the present invention, said evaporation step (b) and said evaporation step ($b_1$) may be carried out at a temperature ranging from 30° C. to 60° C., preferably ranging from 35° C. to 55° C., at a pressure ranging from 50 mbar to 1 bar, preferably ranging from 80 mbar to 150 mbar, for a time ranging from 1 hour to 48 hours, preferably ranging from 12 hours to 24 hours.

Preferably, the lipids comprised in the second organic phase obtained in said evaporation step (b) or in said evaporation step ($b_1$) are triglycerides, more preferably glycerol esters with fatty acids having from 14 to 24 carbon atoms such as, for example, palmitic acid, stearic acid, oleic acid, α-linoleic acid, in quantities greater than or equal to 80% by weight, preferably greater than or equal to 90% by weight, with respect to the total weight of the lipids. Other lipids that may be present in said second organic phase are: phospholipids, monogylcerides, diglycerides, free fatty acids, or mixtures thereof.

The lipids obtained according to the process of the present invention may be subjected to esterification in the presence of at least one alcohol having from 1 to 4 carbon atoms, preferably methanol, ethanol, and at least one acidic or basic catalyst, in order to produce glycerol and alkyl esters, in particular methyl esters or ethyl esters (biodiesel). Alternatively, said lipids may be subjected to hydrogenation/deoxygenation in the presence of hydrogen and of at least one catalyst in order to produce green diesel. Hydrogenation/deoxygenation processes are known in the art and are described, for example, in European patent application EP 1,728,844.

In accordance with a preferred embodiment of the present invention, said liquefaction step (c) and said liquefaction step ($c_1$) may be carried out in the presence of at least one inorganic acid such as, for example, sulfuric acid, nitric acid, hydrochloric acid, phosphoric acid, or mixtures thereof. Preferably, said inorganic acid may be added to said first slurry phase obtained in said extraction step (a) or to said first slurry phase obtained after adding water to said dehydrated solid phase obtained in said extraction step ($a_2$), in a quantity ranging from 0.5% by weight to 2% by weight, preferably ranging from 0.8% by weight to 1.5% by weight, with respect to the total weight of said first slurry phase.

Said liquefaction step (c) and said liquefaction step ($c_1$) may be carried out in liquefaction reactors known in the art, for example autoclaves, tubular reactors, agitated reactors, reactors with internal or external recirculation.

Said liquefaction step (c) and said liquefaction step ($c_1$) may be carried out by operating in different modes such as, for example, "batch", "semi-batch", or continuous mode, preferably in continuous mode.

Whereas the heat energy required in said liquefaction step (c) and in said liquefaction step ($c_1$) may derive totally or partially from heat recovery or from the combustion of traditional energy carriers, for example, methane gas, LPG, mineral oil, coal etc., it is not excluded that the heat energy could derive from other renewable sources such as, for example, solar, biomass, or from fuels deriving from biomass such as, for example, biogas, biomethane, syngas, bio-liquids, bio-solids.

Said separation step (d) and said separation step ($d_1$) may be carried out through techniques known in the state of the art such as, for example, gravitational separation (e.g., sedimentation, decanting), filtration, centrifugation. Preferably, said second slurry phase comprising sugars, proteins and unconverted carbohydrates, is subjected to gravitational separation (e.g., sedimentation, decantation), or centrifugation.

For the purpose of producing proteins, the wet solid phase comprising proteins and unconverted carbohydrates obtained in said separation step (d) or in said separation step ($d_1$) may be subjected to dehydration, obtaining a dehydrated solid phase comprising proteins and unconverted carbohydrates.

In accordance with a further embodiment of the present invention, said process may comprise subjecting the wet solid phase comprising proteins and unconverted carbohydrates obtained in said separation step (d) or in said separation step ($d_1$) to dehydration.

Said dehydration may be carried out through known techniques such as, for example, drying in static ovens, in conveyor belt ovens, in rotary ovens, or through steam drying.

For the purpose of producing bio-oil, the wet solid phase comprising proteins and unconverted carbohydrates obtained in said separation step (d) or in said separation step ($d_1$) may be subjected to liquefaction [step (e)].

Said liquefaction step (e) may be carried out in liquefaction reactors known in the art such as, for example autoclaves, tubular reactors, agitated reactors, reactors with internal or external recirculation.

In accordance with a further embodiment of the present invention, said process may comprise (e) subjecting the wet solid phase comprising proteins and carbohydrates obtained in said separation step (d) or in said separation step ($d_1$) to liquefaction by operating at a temperature ranging from 220° C. to 350° C., preferably ranging from 230° C. to 320° C., even more preferably ranging from 240° C. to 310° C., at a pressure greater than the water vapor pressure at the temperature at which said liquefaction is carried out for a time ranging from 30 minutes to 300 minutes, preferably ranging from 50 minutes to 270 minutes, obtaining a mixture including an oily phase consisting of bio-oil, a solid phase (i.e. residue), an aqueous phase and a gaseous phase, mainly composed of carbon dioxide ($CO_2$).

It is to be noted that for the process according to the present invention, prior to subjecting said wet solid phase to said liquefaction step (e), water may be added to it in a quantity such as to obtain a water concentration ranging from 50% by weight to 90% by weight, preferably ranging from 60% by weight to 80% by weight, with respect to the total weight of said wet solid phase.

Whereas the heat energy required in said liquefaction step (e) may derive totally or partially from heat recovery or from the combustion of traditional energy carriers, for example, methane gas, LPG, mineral oil, coal etc., it is not excluded that the heat energy could derive from other renewable sources such as, for example, solar, biomass, or from fuels deriving from biomass such as, for example, biogas, biomethane, syngas, bio-liquids, bio-solids.

The oily phase, the solid phase and the aqueous phase included in the mixture obtained in said liquefaction step (e), may be separated through techniques known in the state of the art such as, for example, gravitational separation (e.g., sedimentation, decanting), filtration, centrifugation. Preferably, said phases are separated by gravitational separation (e.g., sedimentation, decanting), or by centrifugation.

With regard to the gaseous phase, the operations are as follows. Said gaseous phase, which is equal to about 4% by weight-25% by weight with respect to the weight (dry weight) of said wet solid phase, is mainly composed of carbon dioxide (about 80% by moles-98% by moles) and of a mixture of hydrocarbons having from 1 to 4 carbon atoms such as, for example, methane, ethane, ethylene, propane, propylene, butene, or other gases such as, for example, carbon monoxide, hydrogen, sulfuric acid, alkyl-thioethers, thiols, other sulfur compounds (about 2% by moles-20% by moles). Such gaseous phase, after separation, which may be carried out, for example, by depressurization of the liquefaction reaction in which said liquefaction step (e) is carried out before sending the mixture obtained (oily phase+solid phase+aqueous phase) in said liquefaction step (e) for separation, is generally sent for further treatment in order to exploit its combustible organic component and make it compatible for release into the atmosphere.

It is to be noted that the solid phase obtained after separation of the mixture obtained in said liquefaction step (e), which generally comprises ash and inert substances (said ash and inert substances comprising, for example, carbonates and mixed phosphates of calcium, sodium and magnesium, iron oxides, silica and organic residues of a carbonaceous nature), according to the final use of the bio-oil and of the transformation process to which it is subjected, may also not be separated from the mixture obtained in said liquefaction step (e).

For example, in the case in which said bio-oil is subjected to hydrotreating through EST ("Eni Slurry Technology"), described in detail in the following Italian patent applications: MI95A001095, MI2001A001438, MI2002A002713, MI2003A000692, MI2003A000693, MI2003A002207, MI2004A002445, MI2004A002446, MI2006A001512, MI2006A001511, MI2007A001302, MI2007A001303, MI2007A001044, MI2007A001045, MI2007A001198, MI2008A001061, it is not necessary to separate said solid phase and therefore only the aqueous phase is separated, by operating as described above.

The aqueous phase obtained after separation of the mixture obtained in said liquefaction step (e) comprises part of the organic material included in said wet solid phase. Generally, said aqueous phase may have an organic material content greater than or equal to 2% by weight, preferably ranging from 5% by weight to 15% by weight, with respect to the total weight of said aqueous phase, equivalent to a conversion ranging from 15% by weight to 50% by weight with respect to the weight (dry weight) of the wet solid phase subjected to liquefaction in the aforementioned step (e). Preferably, said aqueous step is recycled to said liquefaction step (e).

The bio-oil obtained through the aforementioned liquefaction step (e) may be sent to the subsequent processing steps for the purpose of transforming it, for example, into biofuel, through upgrading treatments known in the art such as, for example, hydrogenation, deoxygenation, hydrocracking, cracking, hydrotreating carried out through the EST ("Eni Slurry Technology") mentioned above.

For the purpose of producing biogas, the aqueous phase comprising sugars obtained in said separation step (d) or in said separation step ($d_1$) may be subjected to biological treatment

[Step (f)]

In accordance with a further embodiment of the present invention, said process may comprise (f) subjecting the aqueous phase comprising sugars obtained in said separation step (d) or in said separation step ($d_1$) to biological treatment, preferably to anaerobic digestion, obtaining biogas, water and sludge. The water and sludge obtained may be sent for subsequent treatment. For example, the water may be sent for anaerobic digestion treatment for the purpose of completing the removal of the organic substances still present, and subsequently sent to one or more filtration steps for the purpose of removing the remaining suspended solids. The sludge, instead, may be sent to a thickening step and, then, to a dehydration step, and then exploited, for example, as fertilizer.

The present invention will now be illustrated in more detail through some embodiments with reference to FIGS. 1-3 reported below.

FIG. 1 depicts a first embodiment of the process according to the present invention. For that purpose, municipal solid waste (MSW) (Stream 1) is subjected to extraction with solvent, at room temperature, in the presence of at least one low-boiling point solvent (Stream 2), thereby obtaining a first organic phase comprising lipids and solvent (Stream 4), and a first slurry phase comprising carbohydrates and proteins (Stream 3). Said first organic phase comprising lipids and solvent (Stream 4) is subjected to evaporation of the solvent obtaining a second organic phase comprising lipids (Stream 7) and a third organic phase comprising solvent (Stream 5) which is recycled to extraction with solvent. Said first slurry phase comprising carbohydrates and proteins (Stream 3) is subjected to liquefaction obtaining a second slurry phase comprising sugars, proteins and unconverted carbohydrates (Stream 6) which is subjected to separation obtaining an aqueous phase comprising sugars (Stream 8) (indicated in FIG. 1 as "Sugary waters") and a wet solid phase comprising proteins and unconverted carbohydrates (Stream 9). Said wet solid phase comprising proteins and unconverted carbohydrates (Stream 9) is subjected to dehydration obtaining a dehydrated solid phase comprising proteins and unconverted carbohydrates (Stream 10) (indicated in FIG. 1 as "Proteins"). Said second organic phase comprising lipids (Stream 7) may be sent to subsequent processing phases for transforming the lipids contained therein, for example, into bio-diesel or green diesel through treatments, for example, esterification or hydrogenation/deoxygenation (not shown in FIG. 1).

Figure 2:
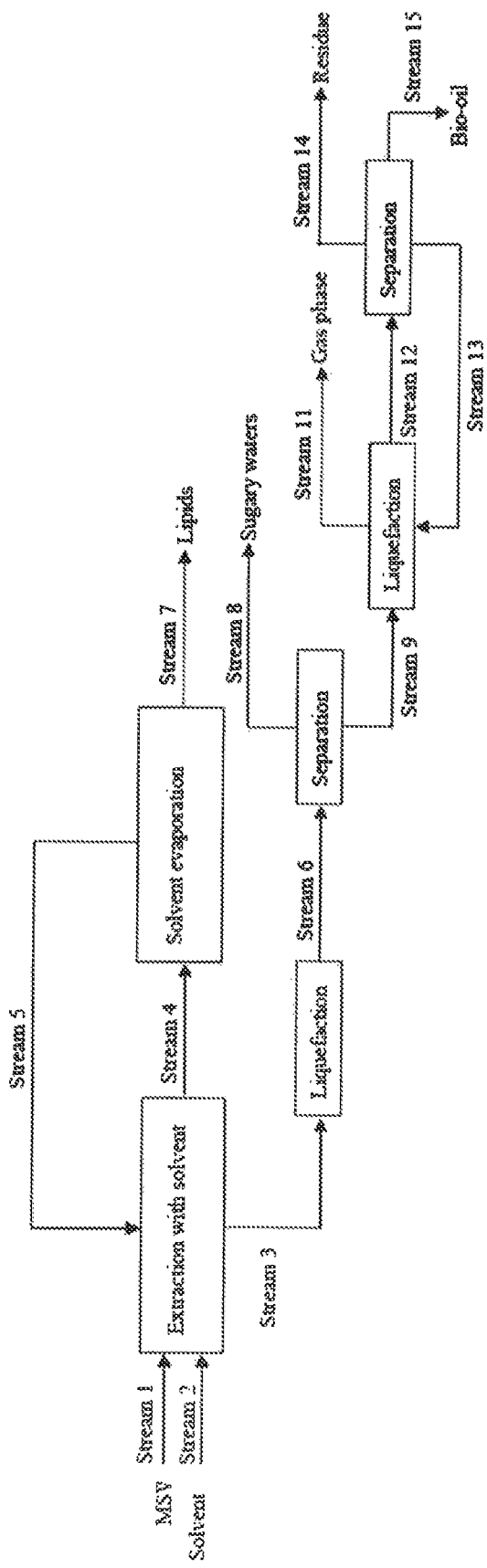
FIG. 2 illustrates a process for producing lipids and other organic compounds according to a second embodiment.

FIG. 2 depicts a second embodiment of the process according to the present invention. For that purpose, municipal solid waste (MSW) (Stream 1) is subjected to extraction with solvent, at room temperature, in the presence of at least one low-boiling point solvent (Stream 2), thereby obtaining a first organic phase comprising lipids and solvent (Stream 4), and a first slurry phase comprising carbohydrates and proteins (Stream 3). Said first organic phase comprising lipids and solvent (Stream 4) is subjected to evaporation of the solvent obtaining a second organic phase comprising lipids (Stream 7) and a third organic phase comprising solvent (Stream 5) which is recycled to extraction with solvent. Said first slurry phase comprising carbohydrates and proteins (Stream 3) is subjected to liquefaction obtaining a second slurry phase comprising sugars, proteins and unconverted carbohydrates (Stream 6) which is subjected to separation obtaining an aqueous phase comprising sugars (Stream 8) (indicated in FIG. 2 as "Sugary waters") and a wet solid phase comprising proteins and unconverted carbohydrates (Stream 9). Said wet solid phase comprising proteins and unconverted carbohydrates (Stream 9) is subjected to liquefaction obtaining a mixture including an oily phase consisting of bio-oil, a solid phase, and an aqueous phase (Stream 12). During liquefaction, a gaseous phase (Stream 11) is also produced (indicated in FIG. 2 as "Gas phase") comprising $CO_2$, gaseous hydrocarbons having from 1 to 4 carbon atoms, or other gases, which may be separated, for example, through the depressurization of the pressure vessel in which the liquefaction is carried out, prior to sending the mixture (oily phase+solid phase+aqueous phase) (Stream 12) obtained after liquefaction to the phase separation section, obtaining bio-oil (Stream 15) and a solid phase (Stream 14) (indicated in FIG. 2 as "Residue") comprising ash and inert substances and an aqueous phase (Stream 13) which is recycled to liquefaction. The gaseous phase thus obtained (Stream 11) may be sent for further treatment for the purpose of exploiting its combustible organic component (not shown in FIG. 2). Said second organic phase comprising lipids (Stream 7) may be sent to subsequent processing phases for transforming the lipids contained therein, for example, into bio-diesel or green diesel through treatments, for example, esterification or hydrogenation/deoxygenation (not shown in FIG. 2). The bio-oil (Stream 15) thus obtained may be sent to subsequent processing steps for transforming it, for example, into bio-fuel through hydrogenation or cracking treatments, for example (not shown in FIG. 2).

Figure 3:
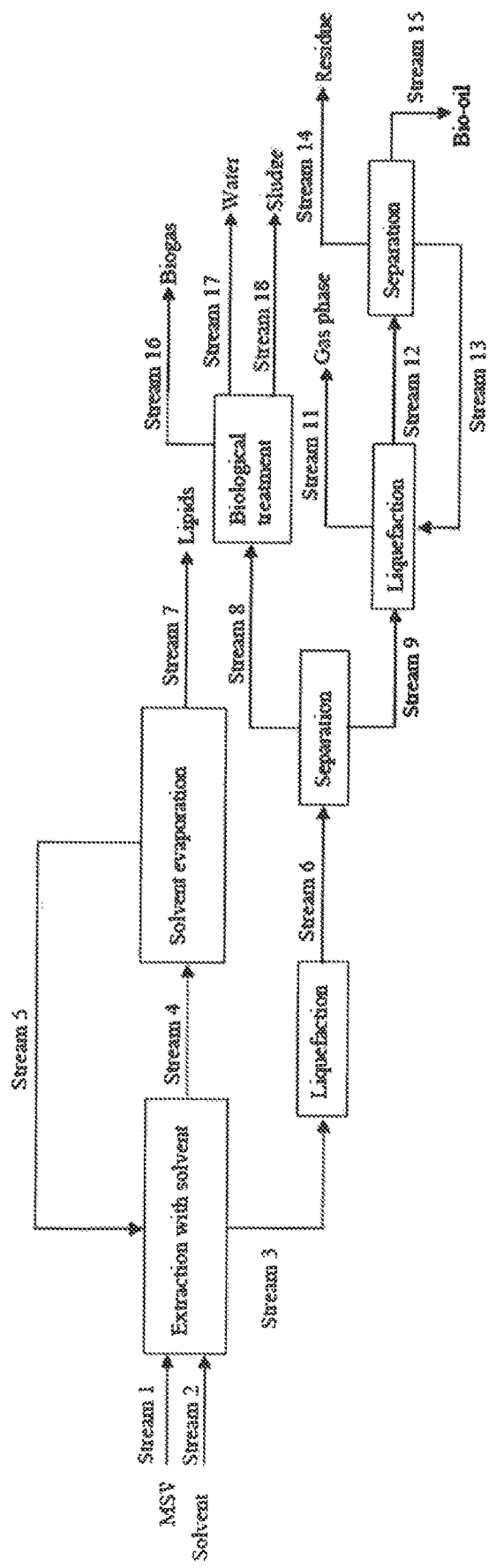
FIG. 3 illustrates a process for producing lipids and other organic compounds according to a third embodiment.

FIG. 3 depicts a third embodiment of the process according to the present invention. For that purpose, municipal solid waste (MSW) (Stream 1) is subjected to extraction with solvent, at room temperature, in the presence of at least one low-boiling point solvent (Stream 2), thereby obtaining a first organic phase comprising lipids and solvent (Stream 4), and a first slurry phase comprising carbohydrates and proteins (Stream 3). Said first organic phase comprising lipids and solvent (Stream 4) is subjected to evaporation of the solvent obtaining a second organic phase comprising lipids (Stream 7) and a third organic phase comprising solvent (Stream 5) which is recycled to extraction with solvent. Said first slurry phase comprising carbohydrates and proteins (Stream 3) is subjected to liquefaction obtaining a second slurry phase comprising sugars, proteins and unconverted carbohydrates (Stream 6) which is subjected to separation obtaining an aqueous phase comprising sugars (Stream 8) and a wet solid phase comprising proteins and unconverted carbohydrates (Stream 9). Said wet solid phase comprising proteins and unconverted carbohydrates (Stream 9) is subjected to liquefaction obtaining a mixture including an oily phase consisting of bio-oil, a solid phase, and an aqueous phase (Stream 12). During liquefaction, a gaseous phase (Stream 11) is also produced (indicated in FIG. 3 as "Gas phase") comprising $CO_2$, gaseous hydrocarbons having from 1 to 4 carbon atoms, or other gases, which may be separated, for example, through the depressurization of the pressure vessel in which the liquefaction is carried out, prior to sending the mixture (oily phase+solid phase+aqueous phase) (Stream 12) obtained after liquefaction to the phase separation section, obtaining bio-oil (Stream 15) and a solid phase (Stream 14) (indicated in FIG. 3 as "Residue") comprising ash and inert substances and an aqueous phase (Stream 13) which is recycled to liquefaction. The gaseous phase thus obtained (Stream 11) may be sent for further treatment for the purpose of exploiting its combustible organic component (not shown in FIG. 3). Said second organic phase comprising lipids (Stream 7) may be sent to subsequent processing phases for transforming the lipids contained therein, for example, into bio-diesel or green diesel through treatments, for example, esterification or hydrogenation/deoxygenation (not shown in FIG. 3). The bio-oil (Stream 15) thus obtained may be sent to subsequent processing steps for transforming it, for example, into bio-fuel through hydrogenation or cracking treatments, for example (not shown in FIG. 3). Said aqueous phase comprising sugars (Stream 8) is subjected to biological treatment (e.g., anaerobic digestion) obtaining biogas (Stream 16), water (Stream 17) and sludge (Stream 18). Said water (Stream 17) and sludge (Stream 18) may be sent for further purification treatments (not shown in FIG. 3).

For the purpose of understanding the present invention better and to put it into practice, below are some illustrative and non-limiting examples thereof.

Example 1 (Comparative)

Liquefaction of municipal solid waste (MSW) without extraction with solvent A biomass (i.e. a sample of municipal solid waste called MSW-4), previously homogenized through a cutting mill, was loaded into an autoclave with a nominal volume of 1 liter: the homogenization allowed a product to be obtained having a creamy appearance with particle size less than 1 mm.

For analytical purposes, an aliquot of the homogenized material (500 g) was anhydrified through drying in a vacuum oven at 60° C., in order to determine the dry weight which was equal to 32.3% by weight. The macrocomposition of the homogenized material as such and after anhydrification is shown in Table 1. The analysis of the macrocomposition was carried out through the ISTISAN 1996/34 (National Institute of Health in Italy) methodology, as specified below:

proteins (N×6.25): ISTISAN 1996/34, pag. 13;
humidity: ISTISAN 1996/34, pag. 7, Method B;
ash ISTISAN 1996/34, pag. 77;
lipids: ISTISAN 1996/34, pag. 41;
carbohydrates: calculated to reach a total of 100.

TABLE 1

| MSW-4 | Lipids (%)* | Carbohydrates (%)* | Proteins (%)* | Ash (%)* | Water (%)* | Total (%)* |
|---|---|---|---|---|---|---|
| As such | 8.9 | 11.7 | 7.6 | 1.6 | 70.1 | 100 |
| Anhydrous | 29.8 | 39.3 | 25.5 | 5.4 | 0 | 100 |

*% by weight with respect to the total weight of the homogenized material as such (As such) or with respect to the total weight of the homogenized material after anhydrification (Anhydrous).

After loading 400 g of homogenized biomass, as such, into the autoclave, nitrogen was blown for 5 minutes in order to remove the oxygen present. The autoclave was, then, pressurized with nitrogen setting 1 bara (absolute pressure) and, then, the heating ramp was activated and, at 180° C., agitation was started. After reaching the temperature of 310° C., everything was left, under agitation, at said temperature, for 1 hour. Subsequently, the autoclave was left to cool and upon reaching room temperature the gas phase was separated through depressurization. Then an aliquot of the aqueous phase as such (10 ml) was taken for the purpose of subjecting it to the analyses specified below: the results obtained are shown in Table 4. Subsequently, ethyl acetate (300 ml) was poured into the autoclave, which was closed again: everything was left, under agitation, at room temperature, for 3 hours. Subsequently, the autoclave was stopped and the suspension obtained was unloaded and filtered on paper (25 micron), to separate the solid phase (i.e. solid residue) from the aqueous phase and from the oily phase containing bio-oil. The solid residue recovered was washed on the filter and then subjected to drying in a vacuum oven, at 60° C., for 48 hours. The aqueous phase and the oily phase containing bio-oil were left to unmix in a separator funnel, obtaining: a heavier aqueous phase and a lighter solvent phase containing bio-oil which, after separation from the aqueous phase through filtration, was anhydrified with the addition of sodium sulfate ($Na_2SO_4$—Aldrich), then filtered again and, after evaporation of the solvent in the rotary evaporator, it was weighed obtaining the weight of the bio-oil produced. The results obtained are shown in Table 2, in terms of % yield by weight both over the total weight of the homogenized material as such ("Yield over as such") and over the total weight of the dry component of the homogenized material obtained after anhydrification ("Yield over dry").

TABLE 2

|  | Bio-oil (%) | Solid residue (%) | Aqueous phase (%)* | Gas phase (%) |
|---|---|---|---|---|
| Yield over as such | 11.6 | 6.5 | 78.1 | 3.8 |
| Yield over dry | 36.0 | 20.2 | 32.1 | 11.7 |

*estimated by difference with respect to 100.

The samples thus obtained, i.e. bio-oil, aqueous phase and solid phase (i.e. solid residue) were analyzed using the following analytical methods.

Aqueous Phase

The light acid quantities (formic acid, propionic acid, acetic acid, succinic acid, butyric acid) were determined using a DIONEX BIOLC 4000 ion-exchange chromatography system provided with:

PED (Pulsed Electrochemical Detector);
chromatography column Ice-AS1 (diameter: 9 mm, length 250 mm);
AMMS-IEC (Anion MicroMembrane Suppressor—Ion Exclusion Chromatography) with chemical regenerant for suppression with 5 mM tetrabutylammonium hydroxide (TBAOH—Aldrich);
50 µl injection loop;

operating with isocratic elution using 0.4 mM heptafluorobutyric acid (Aldrich) as the eluent. The quantities of alcohols (methanol, ethanol) were determined as follows. For that purpose, a sample of the aqueous phase was subjected to gas chromatography separation combined with a Flame Ionization Detector (FID) system, using a fused-silica capillary gas chromatography column: Supelcowax-10 (30 m×0.32 mm ID) in the cross-linked phase, with a phase thickness of 0.5 µm, applying the following operating conditions:

temperature program: initial temperature: 40° C.; isotherm for 5 minutes; 10° C./min increase up to the temperature of 200° C.;
FID temperature: 260° C.;
air: 400 ml/min;
hydrogen: 40 ml/min;
injector: split/splitless in split mode with 30 ml/min split vent and temperature of 220° C.;
injection volume: 1 µl;
carrier gas: helium 4 ml/min;
internal standard: n-decane (Aldrich).

The quantities of sugars (glucose, mannose) were determined through HPAE (High Performance Anion Exchange) using a Thermo-Scientific Dionex ICS 5000 chromatography system provided with a PAD (Pulsed Amperometric Detector) which allows the "target" sugars present to be accurately determined, also at low concentrations, in aqueous samples with excellent signal/noise ratios, by applying the following operating conditions:

analytical column: CarboPac PA100 Analytical (2 mm×250 mm) (Dionex);
pre-column: Carbopac PA100 guard (2 mm×50 mm) (Dionex);
eluents: (A) sodium hydroxide (NaOH) 100 mM; (B) sodium hydroxide (NaOH) 200 mM+0.6 mM sodium acetate ($CH_3COONa$);
flow rate: 0.250 ml/min;
injection mode: PushSeqFull;
column temperature: 30° C.;
conductivity detector: PED (Pulsed Electrochemical Detector);
working electrode: gold (Au) on polytetrafluoroethylene (PTFE—Aldrich).

Bio-Oil

The characterization of the bio-oil was carried out using an analytical protocol developed by combining various techniques. In fact, bio-oil has a complex composition, comparable to that of crude oil therefore its detailed characterization is not possible with a single analysis. For the main compounds present in the oil, free fatty acids and amides variously substituted with these acids, their quantification was determined through gas chromatography—mass spectrometry (GC-MS) using SIM (Selected Ion Monitoring) which selectively allows their quantification, by operating as described by Chiaberge S. et al., in "*Energy & Fuels*" (2013), Vol. 27, pag. 1873-1880.

The content of other volatile compounds, such as alkyl-pyrrolidones, diketopiperazine, alkyl-phenols, esters of short chain acids, paraffins and olefins, were estimated based on the graph obtained from the aforementioned gas chromatography—mass spectrometry (GC-MS).

The content of alkyl aromatic compounds containing nitrogen and oxygen within the molecular structures was instead estimated by relating the data obtained through $^{13}C$-HMR spectrometry and the data obtained through FTICR-MS (high-resolution Fourier-Transform Ion Cyclotron Resonance Mass Spectrometry), operating as described by Chiaberge S. et al., in "*ChemSusChem*" (2013), Vol. 6(1), pag. 160-167.

Solid Residue

The quantity of ash was determined according to the ISTISAN 1996/34 (National Institute of Health in Italy) standard method, pag. 77.

Table 3 shows the composition of the bio-oil obtained. From the data shown in Table 3 it may be deduced that the glycerides, which constitute almost all of the lipid fraction of the starting municipal solid waste (MSW), are almost totally hydrolyzed, while the fatty acids, deriving from the hydrolysis of the glycerides, largely form esters, amides, ketone compounds and, to a smaller extent, alkanes following decarboxylation reactions.

Table 4 shows the organic component present in the aqueous phase. The sum of the carbon deriving from the quantities of acidic compounds and sugars deriving from the above analysis is equal to 7266 ppm with a TOC (Total Organic Carbon) value, determined according to the standard method CNR IRSA 5040 Man 29 2003, equal to 38000 ppm: this highlights that the aqueous phase contains numerous other organic compounds. On this point, it is to be noted that the nature of said other organic compounds, as stated in literature, prevalently consists of ketones, aldehydes, alcohols, alkyl-phenols, nitrogen heterocycles, which are not as easily biodegradable as sugary compounds.

The solid phase (i.e. solid residue) was found to contain 20% by weight of ash over the total weight of said residue and to have a calorific value of 24.5 MJ/kg, indicating a potential loss of carbon which instead of producing bio-oil leads to the formation of said solid phase (i.e. solid residue).

TABLE 3

| (%)* | Classes of compounds |
|---|---|
| 11 | Fatty acids (—COOH with, on average, $C_{16}$-$C_{18}$ chains) |
| 3 | Fatty acid amides (—$CONH_2$/—CONHR) |
| 40 | Compounds that contain at least one aromatic ring |

TABLE 3-continued

| (%)* | Classes of compounds |
|---|---|
| 43 | Paraffins and olefins (average, $C_{16}$ chains) |
| | Fatty acid ethyl and methyl esters |
| | Fatty acid hydroxy amides (e.g., ricinoleic acid) |
| | Various non-lipid acid amides |
| | Fatty acid amides with pentose or hexose derivatives |
| | Fatty acid amides with non-aromatic aminoacids (e.g., methionine) |
| | Ketone compounds on $C_{16}$-$C_{18}$ chains |
| | Alkyl cycloalkanes (e.g., alkyl-cyclohexanes) |
| | Alkyl cyclopentenones (alkyl: $C_6$-$C_{12}$) |
| | Steranes and sterols |
| 3 | Glycerols and others |

*% by weight with respect to the total weight of bio-oil.

TABLE 4

| Aqueous phase | Formates | Acetates | Propionates | Butyrates | Succinates | Mannitol | Glucose | Alcohols | TOC (total) |
|---|---|---|---|---|---|---|---|---|---|
| ppm | 92 | 10218 | 1175 | 626 | 1305 | 3422 | 253 | 494 | 17585 |
| ppm of carbon | 24 | 4086 | 571 | 342 | 531 | 1354 | 100 | 258 | 7266 |

Example 2 (Invention)

Extraction of lipids with solvent or mixture of solvents [step ($a_2$)] from dehydrated municipal solid waste (MSW) and evaporation of the solvent [step ($b_1$)]

Table 6, Table 7 and Table 8 show the lipid yields obtained by subjecting to extraction in the presence of a solvent or of a mixture of solvents, three different biomasses, i.e. three different samples of municipal solid waste (MSW) called MSW-1, MSW-2 and MSW-3, previously homogenized as described in Example 1 and subsequently subjected to dehydration as reported below: the macrocompositions of said samples, obtained through the ISTISAN 1996/34 method reported in Example 1, are reported in Table 5.

TABLE 5

| | Proteins (%)* | Lipids (%)* | Carbohydrates (%)* | Ash (%)* |
|---|---|---|---|---|
| MSW-1 | 35.1 | 10.5 | 48 | 6.4 |
| MSW-2 | 32 | 24.2 | 37.8 | 6 |
| MSW-3 | 27.5 | 44.6 | 23.6 | 4.3 |

*% by weight with respect to the total weight of the homogenized and dehydrated sample.

For that purpose, 22.4 g of each sample were subjected to dehydration through a bland heat treatment (50° C.) and high vacuum (100 mbar), in a laboratory vacuum oven, for the required time to bring the sample to constant weight (10 hours). Subsequently, the dehydrated samples were placed in Falcon 15 ml conical-bottom tubes, in contact with the solvent or the mixture of solvents in a 2 to 1 ratio, in terms of solvent volume with respect to sample volume and the extraction was repeated 3 times. The extraction was carried out at room temperature with contact times of 8 hours, obtaining a first organic phase comprising lipids and solvent, and a dehydrated solid phase comprising carbohydrates and proteins. Said dehydrated solid phase was called MSW-1a for the MSW-1 sample, MSW-2a for the MSW-2 sample and MSW-3a for the MSW-3 sample.

The solvents used or the mixtures of solvents used are reported in the following tables: the mixture n-hexane (Aldrich)/acetone (Aldrich) is a 1/1 (v/v) mixture, the mixture n-hexane (Aldrich)/xylene (Aldrich) is a 1/1 (v/v) mixture.

At the end of the extraction, said first organic phase was subjected to evaporation and the solvent or the mixture of solvents was evaporated, in a laboratory vacuum oven, at a temperature of 50° C., under high vacuum (100 mbar) for the required time to bring the extract to a constant weight (5 hours). The lipids obtained were analyzed as reported below: Table 9, Table 10 and Table 11 show the results obtained. As may be deduced from Tables 9-11, the lipid composition is independent from the type of solvent used but depends exclusively on the starting sample. Furthermore, it is highlighted that most of the extracts are neutral trigylcerides (triacylglycerides) while a small part are free fatty acids unlike the bio-oil reported in Table 3.

The lipids obtained were analyzed using the following analytical methods.

The quantities of fatty acids, of mono-, di- and tri-acylglycerides present in the samples being examined were carried out by internal standardization after silanizating the sample itself using N,O-bis(trimethylsilyl)trifluoroacetamide (BSTFA—Aldrich) as a silanizating agent. For the aforementioned purpose, said quantities were determined through gas chromatography equipped with a Flame Ionization Detector (FID) system, using a fused-silica capillary gas chromatography column: SupelcoPetrocol EX28787 (5 m×0.53 mm ID) in the cross-linked phase, with a phase thickness of 0.5 μm, applying the following operating conditions:

temperature program: initial temperature: 50° C.; isotherm for 2 minutes; 10° C./min increase up to the temperature of 350° C.;
FID temperature: 350° C.;
air: 400 ml/min;
hydrogen: 35 ml/min;
injector: split/splitless in split mode with 30 ml/min split vent and temperature of 220° C.;
injection volume: 1 μl;
carrier gas: helium 5 ml/min;
internal standard: n-decane.

TABLE 6

| | MSW-1 lipid yield (%)* |
|---|---|
| n-hexane | 40.46 |
| n-hexane/acetone | 40.95 |
| n-hexane/xylene | 40.21 |
| dichloromethane | 40.38 |

*% by weight with respect to the total weight of lipids contained in the homogenized and dehydrated sample after extraction.

TABLE 7

| | MSW-2 lipid yield (%)* |
|---|---|
| n-hexane | 24.15 |
| n-hexane/acetone | 24.44 |

TABLE 7-continued

|  | MSW-2 lipid yield (%)* |
| --- | --- |
| n-hexane/xylene | 23.89 |
| dichloromethane | 24.22 |

*% by weight with respect to the total weight of lipids contained in the homogenized and dehydrated sample after extraction.

TABLE 8

|  | MSW-3 lipid yield (%)* |
| --- | --- |
| n-hexane | 10.44 |
| n-hexane/acetone | 10.51 |
| n-hexane/xylene | 10.31 |
| dichloromethane | 10.50 |

*% by weight with respect to the total weight of lipids contained in the homogenized and dehydrated sample after extraction.

TABLE 9

|  | MSW-1 | | | |
| --- | --- | --- | --- | --- |
|  | n-hexane (%)* | n-hexane/ acetone (%)* | n-hexane/ xylene (%)* | dichloromethane (%)* |
| $C_{16}$ | 1.29 | 1.31 | 1 | 1.11 |
| $C_{18}$ | 2 | 1.99 | 2.12 | 2.12 |
| monoacylglycerides | 0.24 | 0.23 | 0.25 | 0.23 |
| diacylglycerides | 7.48 | 7.42 | 7.51 | 7.67 |
| triacylglycerides | 86.84 | 86.94 | 86.92 | 86.68 |
| others | 2.15 | 2.11 | 2.2 | 2.19 |

*% by weight with respect to the total weight of lipids obtained after extraction.

TABLE 10

|  | MSW-2 | | | |
| --- | --- | --- | --- | --- |
|  | n-hexane (%)* | n-hexane/ acetone (%)* | n-hexano/ xylene (%)* | dichloromethane (%)* |
| $C_{16}$ | 1.27 | 1.28 | 1.2 | 1.15 |
| $C_{18}$ | 2 | 2 | 2.2 | 2.1 |
| monoacylglycerides | 0.25 | 0.24 | 0.28 | 0.3 |
| diacylglycerides | 5.49 | 5.35 | 5.3 | 5.22 |
| triacylglycerides | 88.81 | 88.91 | 88.9 | 89.18 |
| others | 2.18 | 2.22 | 2.12 | 2.05 |

*% by weight with respect to the total weight of lipids obtained after extraction.

TABLE 11

|  | MSW-3 | | | |
| --- | --- | --- | --- | --- |
|  | n-hexane % by weight | n-hexane/ acetone % by weight | n-hexane/ xylene % by weight | dichloromethane % by weight |
| $C_{16}$ | 3.99 | 5.12 | 4.05 | 4.49 |
| $C_{18}$ | 14.68 | 14.08 | 14.92 | 15.01 |
| monoacylglycerides | 3.1 | 2.77 | 2.99 | 3.37 |
| diacylglycerides | 2.1 | 2 | 2.2 | 2.19 |
| triacylglycerides | 74.9 | 74.71 | 74.74 | 73.81 |
| others | 1.23 | 1.33 | 1.1 | 1.05 |

*% by weight with respect to the total weight of lipids obtained after extraction.

Example 3 (Invention)

Extraction of lipids with solvent or mixture of solvents [step (a)] from municipal solid waste (MSW) as such and evaporation of the solvent [step (b)]

The extraction of lipids with an n-hexane/acetone (1/1, v/v) mixture was carried out using the same sample of municipal solid waste (MSW) called MSW-2 as such (i.e. wet, without subjecting it to dehydration as described in Example 2): said sample had a water content equal to 67.5% by weight with respect to the total weight of the sample.

For that purpose, 22 g of the sample were placed in Falcon 50 ml conical-bottom tubes, in contact with the solvent or the mixture of solvents in a 2 to 1 ratio, in terms of solvent volume with respect to sample volume and the extraction was repeated 3 times. The extraction was carried out at room temperature with contact times of 8 hours, obtaining a first organic phase comprising lipids and solvent, and a first slurry phase comprising carbohydrates and proteins.

At the end of the extraction, said first organic phase was subjected to evaporation and the n-hexane (Aldrich)/acetone (Aldrich) mixture was evaporated, at a temperature of 50° C., under high vacuum (100 mbar) for a sufficient amount of time to bring the extract to a constant weight (5 hours): the lipids obtained were analyzed as reported above.

The lipid yield obtained is equal to 24.12%: as may be seen from the comparison with Table 7 reported above, the lipid yield does not vary with respect to the extraction of lipids on the dehydrated sample.

Furthermore, as may be deduced from Table 12, the composition of lipids does not vary either with respect to the extraction of lipids on the dehydrated sample.

TABLE 12

|  | n-hexane/acetone (%)* |
| --- | --- |
| $C_{16}$ | 1.09 |
| $C_{18}$ | 1.98 |
| monoacylglycerols | 0.03 |
| diacylglycerols | 5.84 |
| triacylglycerols | 89.6 |
| others | 1.47 |

*% by weight with respect to the total weight of lipids obtained after extraction.

Example 4

Liquefaction of the Dehydrated Solid Phase [Step ($c_1$)] and Separation [Step ($d_1$)]

To the dehydrated solid phase (MSW-2a) (5.5 g) obtained after extraction of the lipids reported in Example 2, whose composition, determined according to the methodologies reported above, is as follows (% by weight with respect to the total weight of the sample):

proteins: 42.2%;

carbohydrates: 49.9%;

ash 7.9%;

water was added in a quantity such as to obtain a concentration of water equal to 64% by weight with respect to the total weight of said dehydrated solid phase, obtaining a first slurry phase. Subsequently, sulfuric acid was added in a quantity such as to obtain a concentration of sulfuric acid equal to 1% by weight with respect to the total weight of said first slurry phase, whose composition, determined according to the methodologies reported above, is reported in Table 13.

TABLE 13

| Proteins (%)* | Carbohydrates (%)* | Ash (%)* | Water (%)* | Acid (%)* |
|---|---|---|---|---|
| 14.9 | 17.3 | 2.8 | 64.0 | 1.0 |

*% by weight with respect to the total weight of the first slurry phase.

Subsequently, everything was subjected to liquefaction, in a 20 ml stainless steel autoclave, operating at a temperature of 160° C., for a time of 90 minutes, obtaining a second slurry phase comprising sugars, proteins and unconverted carbohydrates.

Said second slurry phase was subjected to separation by centrifugation, obtaining a wet solid phase comprising proteins and unconverted carbohydrates and an aqueous phase comprising sugars.

Table 14 shows the composition of said wet solid phase, determined according to the methodologies reported above: from the reported data, it may be deduced that there is a considerable reduction in carbohydrate content with respect to that of the starting dehydrated solid phase (MSW-2a).

TABLE 14

| Proteins (%)* | Carbohydrates (%)* | Ash (%)* |
|---|---|---|
| 75.0 | 10.7 | 14.3 |

*% by weight with respect to the total weight of the wet solid phase.

Example 5

Liquefaction of the Wet Solid Phase [Step (e)]

To the wet solid phase comprising proteins and unconverted carbohydrates obtained in Example 4, demineralized water was added in a quantity such as to obtain a water concentration equal to 76% by weight with respect to the total weight of said wet solid phase obtaining the sample called MSW-2b.

Subsequently, said sample called MSW-2b was subjected to liquefaction in a 20 ml stainless steel autoclave, operating at 300° C., for 60 minutes. At the end of the reaction, the gas phase was separated by depressurization of the autoclave, while the mixture comprising an oily phase, a solid phase and an aqueous phase obtained, was subjected to separation by decantation obtaining bio-oil, a solid phase (Residue) and an aqueous phase: the results obtained are reported in Table 15, in terms of % yield by weight over the total wet solid phase.

TABLE 15

| Bio-oil (%) | Residue (%) | Aqueous phase (%) | Gas phase (%) |
|---|---|---|---|
| 10.4 | 6.5 | 76.8 | 6.3 |

Example 6

Liquefaction of the Wet Solid Phase [Step (e)] and Recycling of Water to Liquefaction To the wet solid phase comprising proteins and unconverted carbohydrates obtained in Example 4, water deriving from the previous liquefaction was added in a quantity such as to obtain a water concentration equal to 76.3% by weight with respect to the total weight of said wet solid phase obtaining the sample called MSW-2c.

Subsequently, said sample called MSW-2c was subjected to liquefaction in a 20 ml stainless steel autoclave, operating at 300° C., for 60 minutes. At the end of the reaction, the gas phase was separated by depressurization of the autoclave, while the mixture comprising an oily phase, a solid phase and an aqueous phase obtained, was subjected to separation by decantation obtaining bio-oil, a solid phase (Residue) and an aqueous phase: the results obtained are reported in Table 16, in terms of % yield by weight over the total wet solid phase.

TABLE 16

| Bio-oil (%) | Residue (%) | Aqueous phase (%) | Gas phase (%) |
|---|---|---|---|
| 10.5 | 6.4 | 76.8 | 6.3 |

From the comparison with Example 5 (Table 15) it may be deduced that the recycling of process water does not cause any reduction in terms of bio-oil yield produced.

The invention claimed is:

1. Process for producing lipids and other organic compounds from a biomass comprising the following steps:
   (a) subjecting said biomass to extraction, at room temperature, in the presence of at least one low-boiling point solvent, thereby obtaining a first organic phase comprising lipids and solvent, and a first slurry phase comprising carbohydrates and proteins;
   (b) subjecting the first organic phase obtained in said step (a) to evaporation of the solvent, obtaining a second organic phase comprising lipids and a third organic phase comprising solvent, which is recycled to said step (a);
   (c) subjecting the first slurry phase obtained in said step (a) to liquefaction operating at a temperature ranging from 100° C. to 200° C., at a pressure greater than the water vapor pressure at the temperature at which said liquefaction is carried out, for a time ranging from 30 minutes to 300 minutes, thereby obtaining a second slurry phase comprising sugars, proteins and unconverted carbohydrates;
   (d) subjecting the second slurry phase obtained in said step (c) to separation, obtaining an aqueous phase comprising sugars and a wet solid phase comprising proteins and unconverted carbohydrates.

2. Process for producing lipids and other organic compounds according to claim 1, wherein said extraction step (a) is carried out for a time period ranging from 2 hours to 12 hours.

3. Process for producing lipids and other organic compounds according to claim 1, wherein the low-boiling point solvent used in said step (a) is selected from the group consisting of: aliphatic hydrocarbons, aromatic hydrocarbons, halogenated hydrocarbons, and mixtures thereof.

4. Process for producing lipids and other organic compounds according to claim 1, wherein said biomass is treated by subjecting it to a preliminary homogenization, grinding or sizing process, before being subjected to said extraction step (a).

5. Process for producing lipids and other organic compounds according to claim 1, wherein said biomass is wet, said biomass having a water content greater than or equal to 50% by weight, relative to the total weight of said biomass.

6. Process for producing lipids and other organic compounds from a biomass comprising:
   ($a_1$) subjecting said biomass to a drying process by operating at a temperature ranging from 30° C. to 60°

C., at a pressure ranging from 50 mbar to 1 bar, for a time ranging from 1 hour and 48 hours, obtaining a dehydrated biomass;

($a_2$) subjecting said dehydrated biomass to extraction, at room temperature, in the presence of at least one low-boiling point solvent, thereby obtaining a first organic phase comprising lipid and solvent, and a solid dehydrated phase comprising dehydrated carbohydrates and proteins;

($b_1$) subjecting the first organic phase obtained in step ($a_2$) to evaporation of the solvent, obtaining a second organic phase comprising lipids and a third organic phase comprising solvent, which is recycled to step ($a_2$);

($c_1$) subjecting the dehydrated solid phase obtained in said step ($a_2$), after addition of water in such a quantity as to obtain a concentration of water ranging from 50% by weight to 90% by weight, relative to the total weight of said solid dehydrated phase, thereby obtaining a first slurry phase, to liquefaction operating at a temperature ranging from 100° C. to 200° C., at a pressure greater than the water vapor pressure at the temperature at which said liquefaction is carried out, for a time ranging from 30 minutes to 300 minutes, thereby obtaining a second slurry phase comprising sugars, protein and unconverted carbohydrates;

($d_1$) subjecting the second slurry phase obtained in said step ($c_1$) to separation, obtaining an aqueous phase comprising sugars and a wet solid phase comprising protein and unconverted carbohydrates.

7. Process for producing lipids and other organic compounds according to claim 6, wherein said extraction step ($a_2$) is carried out for a time period ranging from 2 hours to 12 hours and the low-boiling point solvent is selected from the group consisting of aliphatic hydrocarbons, ketones, halogenated hydrocarbons and mixtures thereof.

8. Process for producing lipids and other organic compounds according to claim 6, wherein said biomass is treated by subjecting it to a preliminary homogenization, grinding or sizing process, before being subjected to said drying step ($a_1$).

9. Process for producing lipids and other organic compounds according to claim 6, wherein said evaporation step ($b_1$) is carried out at a temperature ranging from 30° C. to 60° C., at a pressure ranging from 50 mbar to 1 bar, for a time ranging from 1 hour to 48 hours.

10. Process for producing lipids and other organic compounds according to claim 6, wherein said liquefaction step ($c_1$) is carried out in the presence of at least one inorganic acid; said inorganic acid being added to said first slurry phase obtained after addition of water to said dehydrated solid phase obtained in extraction step ($a_2$), in a quantity ranging from 0.5% by weight to 2% by weight, relative to the total weight of said first slurry phase.

11. Process for producing lipids and other organic compounds according to claim 6, wherein said process comprises subjecting the wet solid phase comprising protein and unconverted carbohydrates obtained in separation step ($d_1$) to dehydration.

12. Process for producing lipids and other organic compounds according to claim 6, wherein said process comprises (e) subjecting the wet solid phase comprising proteins and carbohydrates obtained in separation step ($d_1$) to liquefaction at a temperature ranging from 220° C. to 350° C., at a pressure greater than water vapor pressure at the temperature at which said liquefaction is carried out for a time ranging from 30 minutes to 300 minutes, and obtaining a mixture including an oily phase consisting of bio-oil, a solid phase, an aqueous phase and a gaseous phase composed, mainly, of carbon dioxide ($CO_2$).

13. Process for producing lipids and other organic compounds according to claim 6, wherein said process comprises (f) subjecting the aqueous phase comprising sugars obtained in said separation step ($d_1$) to biological treatment, and obtaining biogas, water and sludge.

14. Process for producing lipids and other organic compounds according to claim 1, wherein said evaporation step (b) is carried out at a temperature ranging from 30° C. to 60° C. at a pressure ranging from 50 mbar to 1 bar for a time ranging from 1 hour to 48 hours.

15. Process for producing lipids and other organic compounds according to claim 1, wherein said liquefaction step (c) is carried out in the presence of at least one inorganic acid; said inorganic acid being added to said first slurry phase obtained in said extraction step (a), in a quantity ranging from 0.5% by weight to 2% by weight, relative to the total weight of said first slurry phase.

16. Process for producing lipids and other organic compounds according to claim 1, wherein said process comprises subjecting the wet solid phase comprising protein and unconverted carbohydrates obtained in separation step (d) to dehydration.

17. Process for producing lipids and other organic compounds according to claim 1, wherein said process comprises (e) subjecting the wet solid phase comprising proteins and carbohydrates obtained in separation step (d) to liquefaction at a temperature ranging from 220° C. to 350° C., at a pressure greater than water vapor pressure at the temperature at which said liquefaction is carried out for a time ranging from 30 minutes to 300 minutes, and obtaining a mixture including an oily phase consisting of bio-oil, a solid phase, an aqueous phase and a gaseous phase composed, mainly, of carbon dioxide ($CO_2$).

18. Process for producing lipids and other organic compounds according to claim 1, wherein said process comprises (f) subjecting the aqueous phase comprising sugars obtained in said separation step (d) to biological treatment and obtaining biogas, water and sludge.

19. Process for producing lipids and other organic compounds according to claim 3, wherein the low-boiling point solvent is selected from the group consisting of n-pentane, n-hexane, n-heptane, n-octane, kerosene, toluene, xylene, acetone, methyl ethyl ketone, ethyl acetate, propyl acetate, dichloromethane, chloroform and mixtures thereof.

20. Process for producing lipids and other organic compounds according to claim 19, wherein the low-boiling point solvent is selected from the group consisting of n-hexane, n-hexane/acetone (1/1, v/v) mixture, n-hexane/xylene (1/1, v/v) mixture, dichloromethane.

* * * * *